United States Patent [19]
Denison et al.

[11] Patent Number: 6,010,278
[45] Date of Patent: Jan. 4, 2000

[54] FAIRINGS FOR DEEPWATER DRILLING RISERS

[75] Inventors: Early Baggett Denison, New Orleans, La.; David Wayne McMillan, Deer Park; Richard Bruce McDaniel, Houston, both of Tex.

[73] Assignee: Shell Oil Company, Houston, Tex.

[21] Appl. No.: 08/896,338

[22] Filed: Jul. 18, 1997

Related U.S. Application Data

[60] Provisional application No. 60/022,686, Jul. 19, 1996.

[51] Int. Cl.[7] ........................................................ F15D 1/10
[52] U.S. Cl. ............................ 405/216; 405/211; 114/243
[58] Field of Search ..................................... 405/211, 212, 405/213, 214, 215, 228, 216; 114/243

[56] References Cited

U.S. PATENT DOCUMENTS

| | | | |
|---|---|---|---|
| 2,949,090 | 8/1960 | Gerber | 114/243 |
| 3,410,096 | 11/1968 | Schuh . | |
| 3,572,041 | 3/1971 | Graaf . | |
| 4,171,674 | 10/1979 | Hale | 114/243 |
| 4,398,487 | 8/1983 | Ortloff et al. | 114/243 |
| 4,439,070 | 3/1984 | Dimmick | 405/216 |
| 4,474,129 | 10/1984 | Watkins et al. | 405/211 |
| 5,410,979 | 5/1995 | Allen et al. | 114/243 |
| 5,421,413 | 6/1995 | Allen et al. | 166/335 |
| 5,460,463 | 10/1995 | Smith | 405/212 |
| 5,722,340 | 3/1998 | Sweetman | 405/211 |
| 5,738,034 | 4/1998 | Wolff et al. | 405/211 |

OTHER PUBLICATIONS

F. Joseph Fischer et al. "Current–Induced Oscillations of Cognac Piles During Installation—Prediction and Measurement," International Assoc. for Hydraulic Research, International Union of Theoretical and Applied Mechanics, *Practical Experiences with Flow–Induced Vibrations*, Symposium Karlsruhe/Germany, Sep. 3–6, 1979, University of Karlsruhe, pp. 570–581.

*Primary Examiner*—David Bagnell
*Assistant Examiner*—Frederick Lagman

[57] ABSTRACT

A fairing system is disclosed for installation about a drilling riser deployed in a deepwater application. In another aspect of the invention, a method for deploying a drilling riser fairing system is disclosed in which a first retaining ring is installed on a buoyancy can encircling the drilling riser and a drilling riser fairings is installed above the first retaining ring. Drilling riser fairing installation folds a pair of fairing sides of a fairing shroud about an axially disposed hinge to surround the buoyancy can above the first retaining ring. A tail connection system secures the tail ends of the fairing sides together and a pair of struts are installed to further secure the fairing sides together. A plurality of interior bearing pads are provided on the internal circumference of the fairing shroud and axial bearing pads are provided on flanges at the upper and lower edges of the fairing shroud. In yet another aspect of the present invention, a method for stowing a drilling riser fairings is disclosed in which a lift harness is connected to lift eyes on the exterior of the fairing shroud and the tail connection system is released from the tail edge of the fairing sides. Struts are removed from the upper and lower flanges of the fairing sides which are then opened up about their hinged connection. The open fairing shroud is lifted and set down in a nested relationship with other removed fairing shrouds.

15 Claims, 7 Drawing Sheets

FAIRINGS FOR DEEPWATER DRILLING RISERS

REFERENCE TO RELATED APPLICATION

This application claims the benefit of U.S. Provisional Application Ser. No. 60/022,686, filed Jul. 19, 1996.

BACKGROUND OF THE INVENTION

The present invention relates to protecting cylindrical elements in offshore operations. More particularly, the present invention relates to protecting cylindrical elements such as drilling and production risers which are under the influence of ocean currents and are potentially subject to problems from drag and from vortex induced vibration ("VIV").

Drilling risers are formed from large diameter tubular goods and serve to enclose the drill string from drilling facilities above the water surface provided on a platform or drilling vessel to the well at the ocean floor. This can be a half mile or more in deepwater developments and the drilling riser is not tied to supporting framework such as the conductor guides in traditional bottom-founded platforms. Buoyancy cans, or other flotation modules, may be deployed along the length of the drilling riser to render it neutrally buoyant, but horizontal or lateral loading from currents on this long, unsupported run is not alleviated by the addition of buoyancy cans. Rather, the presence of buoyancy cans around the circumference of the drilling riser materially increases the profile presented to the current and leads to greater drag and VIV effects.

Unabated, the VIV can lead to premature failure of equipment in high current environments and may require that drilling operations cease in response to temporary high current events such as loop currents experienced in the Gulf of Mexico. Further, lateral load from drag may deform the drilling riser to a bowed shape that presents excessive angles with respect to the derrick at the top and the well at the bottom. As a result, the drill string rotating within the drilling riser contacts the riser wall in passing these transitions and the drilling riser is subjected to excessive wear.

Fairings have been used for drag reduction and VIV suppression in drilling risers. However, the fairings have been difficult to install and to handle. Further, normal drilling operations require that the drilling riser be pulled periodically. This requires that the drilling riser be retrieved, section by section, and that the riser sections, buoyancy cans, and fairings be stowed until run again, section by section. Thus there is a significant need for an improved drilling riser fairing system and handling method that facilitates deployment, removal, storage, and redeployment.

An advantage of the present invention is that it is easily yet securely installed and disassembles easily to a nestable configuration that facilitates stowage. Another advantage of the present invention is that it is well supported for allowing the fairing sections to "weathervane," i.e., to best allow self-orientation to the direction of current. A further advantage in some practices of the present invention is modular stowage and handling.

SUMMARY OF THE INVENTION

Towards the fulfillment of the foregoing and other advantages, an aspect of the present invention is a fairing system installed about a drilling riser deployed in a deepwater application. The drilling riser fairing has a fairing shroud with a pair of fairing sides, each fairing side having a hinge edge and a tail edge. The fairing sides are configured to have a hemicylindrical profile region that begins at the hinge edge and which is configured to substantially encircle about one half of a cylindrically shaped drilling riser. The fairing sides also have a tail profile region that trails off from the hemicylindrical profile region. A hinge connects the fairing sides at their hinge edges and the fairing sides have a pair of flanges, one each along the upper and lower edges of the hemicylindrical profile region. Bearing rings are presented across the flanges in the hemicylindrical profile region of each of the fairing sides. A tail connection system secures the trailing edge of the fairing shroud at the tail edges of the fairing sides. A pair of struts connects the fairing sides on the flange of each the upper and lower edge. Each strut presents an interior bearing surface tangential to a nominal interior circumference defined by the hemicylindrical profile regions of the fairing sides and corresponding closely to the outer circumference of the buoyancy can. Each strut also present and extension of bearing rings on the flanges such that a near full circle bearing surface is achieved.

In another aspect of the invention, a method for deploying a drilling riser fairing system is disclosed in which a first retaining ring, or thrust bearing surface, is installed on a buoyancy can encircling the drilling riser and a drilling riser fairing is installed above the first retaining ring. Drilling riser fairing installation folds a pair of fairing sides of a fairing shroud about an axially disposed hinge to surround the buoyancy can above the first retaining ring. A tail connection system secures the tail ends of the fairing sides together and a pair of struts are installed to further secure the fairing sides together. A plurality of interior bearing pads are provided on the internal circumference of the fairing shroud and axial bearing pads are provided on flanges at the upper and lower edges of the fairing shroud. Both interior bearing pads and axial bearing pads are installed on the pair of struts.

In yet another aspect of the present invention, a method for stowing a drilling riser fairings is disclosed in which a lift harness is connected to lift eyes on the exterior of the fairing shroud and the tail connection system is released from the tail edge of the fairing sides. Struts are removed from the upper and lower flanges of the fairing sides which are then opened up about their hinged connection. The open fairing shroud is lifted and set down in a nested relationship with other removed fairing shrouds.

A BRIEF DESCRIPTION OF THE DRAWINGS

The brief description above, as well as further objects and advantages of the present invention, will be more fully appreciated by reference to the following detailed description of the preferred embodiments which should be read in conjunction with the accompanying drawings in which.

DETAILED DESCRIPTION OF AN ILLUSTRATIVE EMBODIMENT

Figure 1:
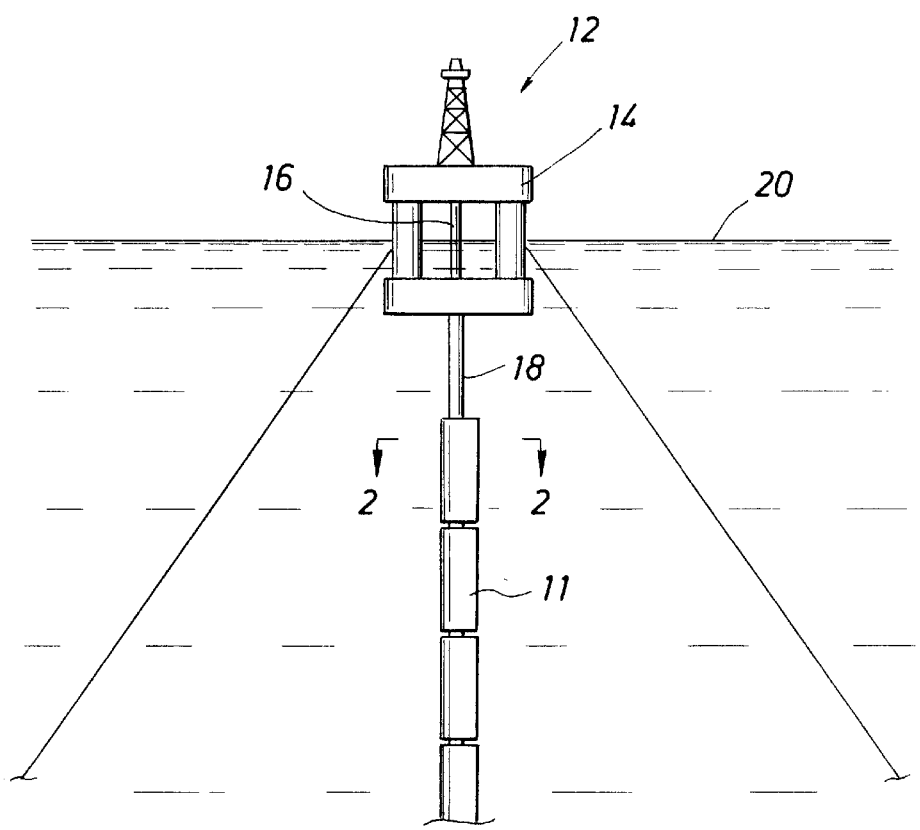
FIG. 1 is a side elevational view of a drilling vessel deploying drilling riser fairings illustrating the environment in which the present invention is used.

FIG. 1 illustrates the environment in which the present invention is deployed. A drilling vessel or platform, here a semi-submersible drilling vessel 12 provides surface facilities 14. Drilling riser 16 descends from the beneath the deck of the surface facilities and is fitted with circumferencial buoyancy provisions such as buoyancy cans or other flotation modules 18 below the ocean surface 20. The buoyancy cans help support the weight of the drilling riser, but presents an enlarged cylindrical profile to ocean currents. Fairings 11 are installed along the drilling riser to manage drag and VIV problem the long, unsupported drilling riser might otherwise encounter.

Figure 2:
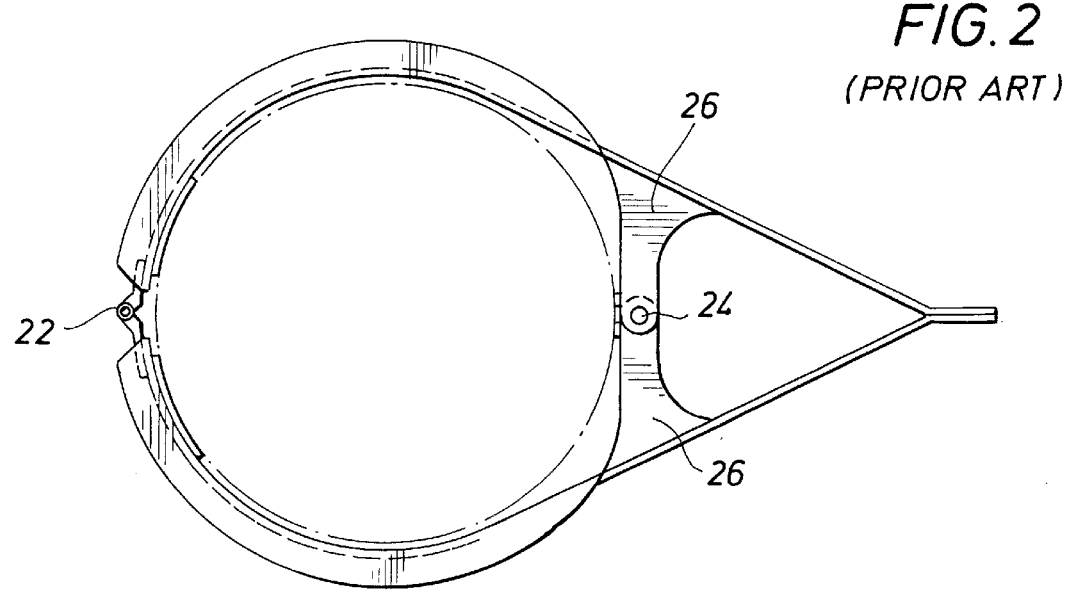
FIG. 2 is a cross sectional view of a prior art drilling riser fairing in accordance with FIG. 1, taken along line 2—2 of FIG. 1.
Figure 3:
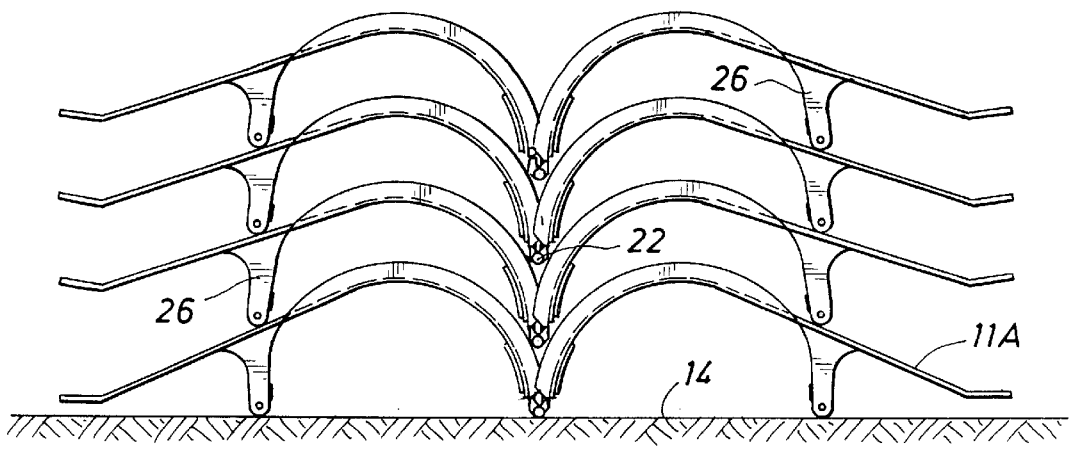
FIG. 3 illustrates an end elevational view of a plurality of drilling riser fairings in accordance with the prior art as stacked for storage.

FIG. 2 illustrates a drilling riser fairing 11A from the prior art. This drilling riser fairing was provided with a hinged connection 22 and was secured by a single pin 24 which inserted through integrally formed, projecting strut halves 26. These projecting strut halves were particularly subject to damage during handling operations and complicated stowage operations because they precluded compact nesting. See FIG. 3. However, the drilling risers must be routinely run and retrieved and handling and stowage capabilities are a fundamental requirement of the equipment.

Figure 4:
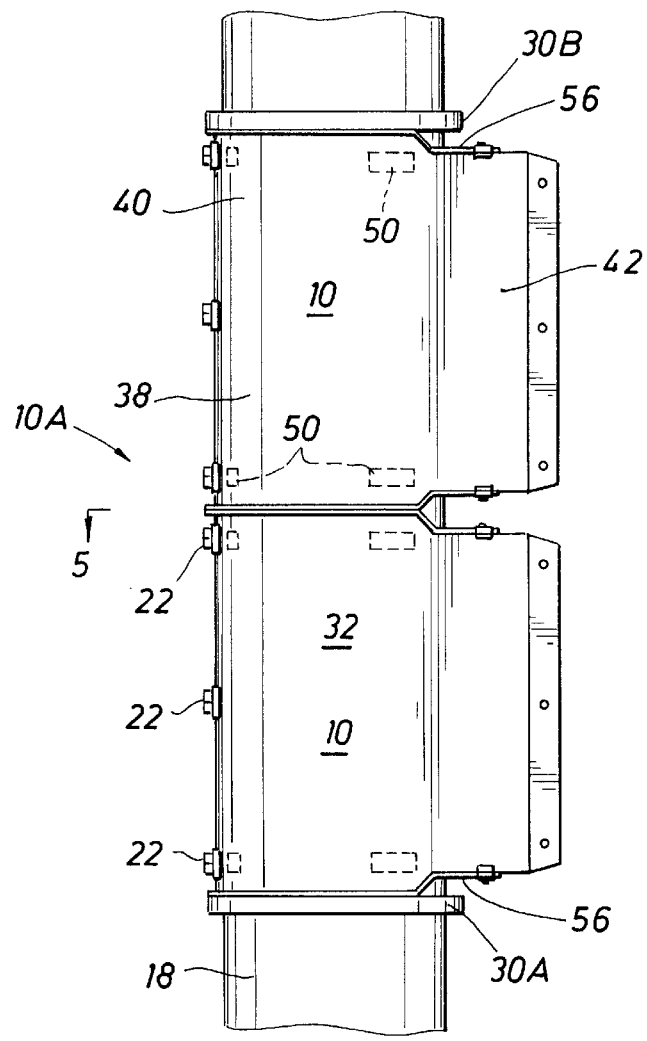
FIG. 4 is a side elevational view of a plurality of drilling riserfairings in accordance with the present invention deployed about a drilling riser.

FIG. 4 illustrates one embodiment of the present invention. Here a plurality of drilling riser fairings 10 have been installed about the periphery of a buoyancy can 18 which have been installed on the drilling riser (not shown). First and second thrust collars or retainer rings 30A and 30B have been installed about the buoyancy cans to bracket drilling riser fairing set 10A.

Figure 5:
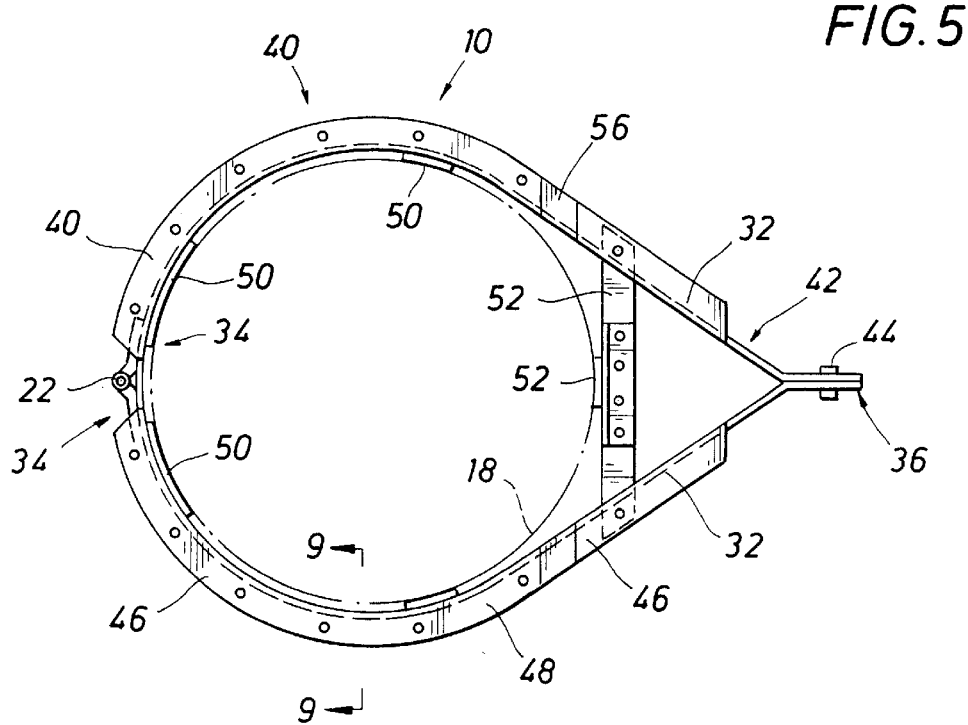
FIG. 5 is a top elevational view of a drilling riser in accordance one embodiment of the present invention taken along line 5—5 in FIG. 4.
Figure 6:
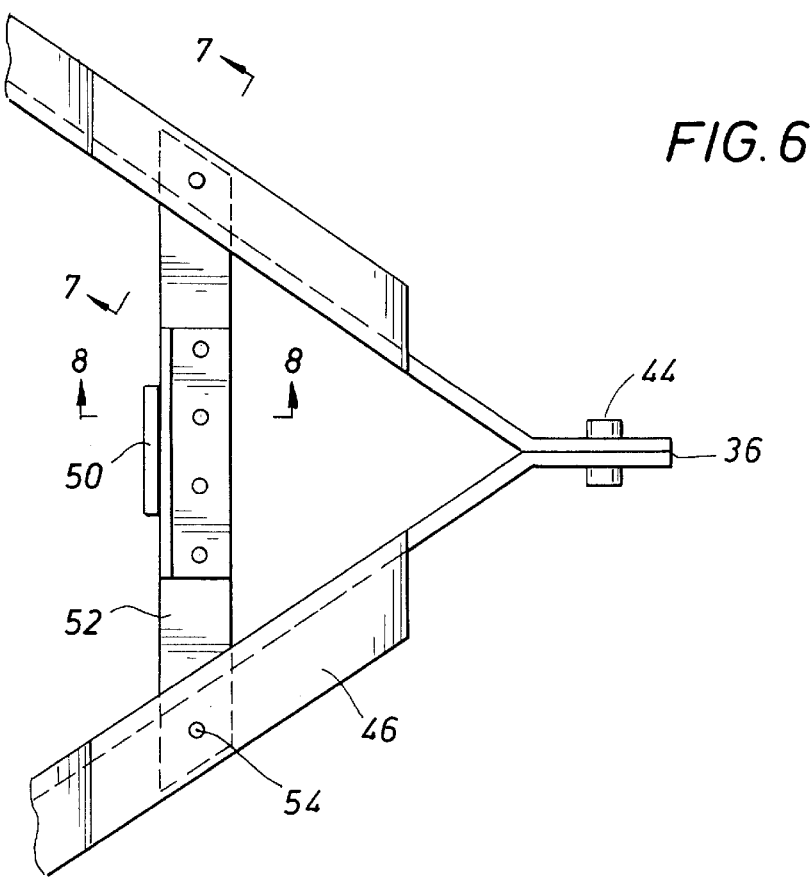
FIG. 6 is a close-up of the tail of the drilling riser of FIG. 5.

FIG. 5 is a top view of drilling riser fairing 10. The outline of buoyancy can 18 is shown in dotted outline. Fairing 10 has two halves, fairing sides 32. Together the fairing sides make up a fairing shroud 40. The fairing shroud may be conveniently made from fiberglass.

A plurality of hinges 22 connects fairing sides 32 at an axially aligned hinge edge 34. A strong, corrosion resistant material such as stainless steel is suitable for the hinge. A tail edge 36 is opposite hinge edge 34 on each fairing side. A hemicylindrical profile region 18 begins at the hinge edge and is configured to provide an interior circumference which will rotatively receive the outer diameter of the drilling riser and buoyancy can, if any. A tail profile region 42 trails off from the hemicylindrical profile region to tail end 36.

A flange 46 extends along the upper and lower edges of fairing shroud 40. Around the hemicylindrical profile region, flange 46 is provided with a bearing ring 48. The bearing ring provides a sliding surface for axial abutment of adjacent fairings and/or retaining rings. Free rotation is desired to allow the fairing shroud to weathervane about the buoyancy can so as to orient with the prevailing ocean current. Suitable materials for the bearing ring include high density polyethylene or Delrin.

Similarly bearing pads 50 are placed inside the periphery of the fairing shroud to facilitate free rotation.

Figure 7:
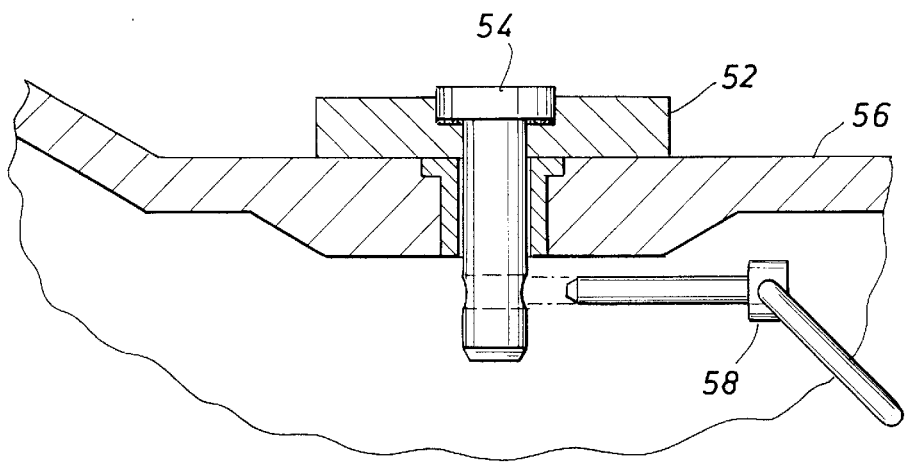
FIG. 7 is a cross sectional view of the end of the strut deployed in the drilling riser fairing of FIG. 5, as taken along line 7—7 in FIG. 6.

Tail ends 36 are joined by tail connection assembly 44. Further, the fairing shroud is also secured about the riser/buoyancy can assembly with a strut 52 at the upper and lower edges. Strut 52 is conveniently pinned in place. Pins 54 are secured to the strut and protrude outwardly. The pins are inserted through a drop shoulder portion 56 (see FIG. 4) of flange 46 at tail profile portion 42 of the fairing shroud. Lynch pins 58 or similar fasteners secure strut pins 54 in place. See FIG. 7.

Figure 8:
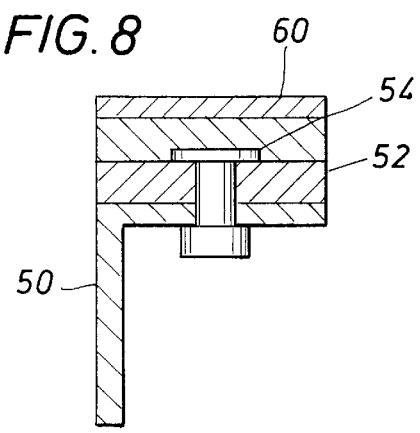
FIG. 8 is a cross sectional view of the end of the strut deployed in the drilling riser fairing of FIG. 5, as taken along line 8—8 in FIG. 6.

Further, it is desirable to provide strut 52 with a bearing pad 50 for the inner circumference and, optionally, an axial bearing pad 60 which may present a bearing surface even with the elevation of bearing ring 48. See FIG. 8.

Figure 9:
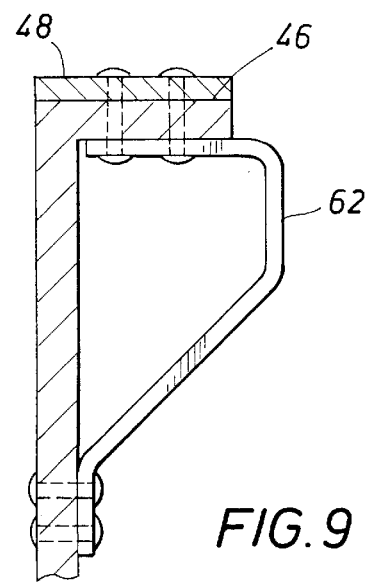
FIG. 9 is a cross sectional view of a lift eye deployed in the drilling riser fairing of FIG. 5, as taken along line 9—9 in FIG. 5.
Figure 10:
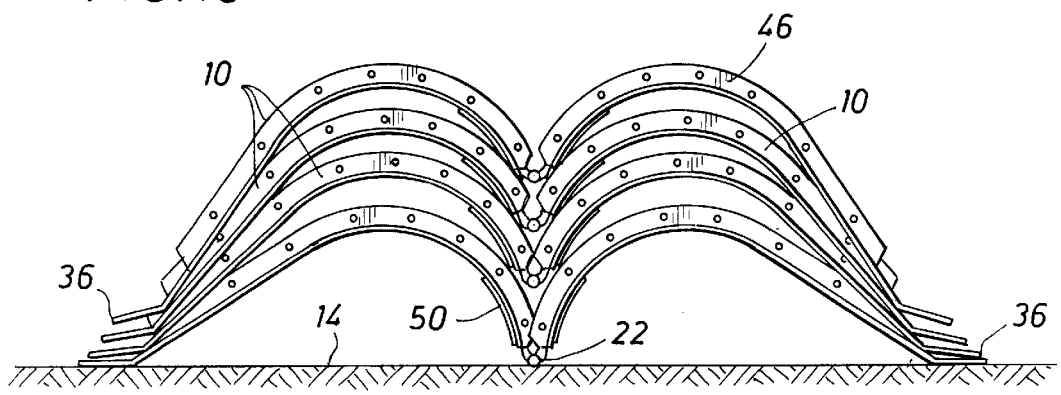
FIG. 10 illustrates an end elevational view of a plurality of drilling riser fairings in accordance with the present invention stacked for storage.

The fairing shrouds are conveniently provided with lift eyes 62 adjacent top flange 46. See FIG. 9. The lift eyes facilitate handling the fairing shroud when the drilling riser faring 10 is deployed or removed and stowed. FIG. 10 illustrates the nestability of the present invention. This facilitates the stowage of the fairings when the drilling riser is being either run or pulled. Compare this with FIG. 3, bearing in mind that these fairing might be six to eight feet long each and require enough to span the extreme depths that is now the deepwater frontier.

Figure 11:
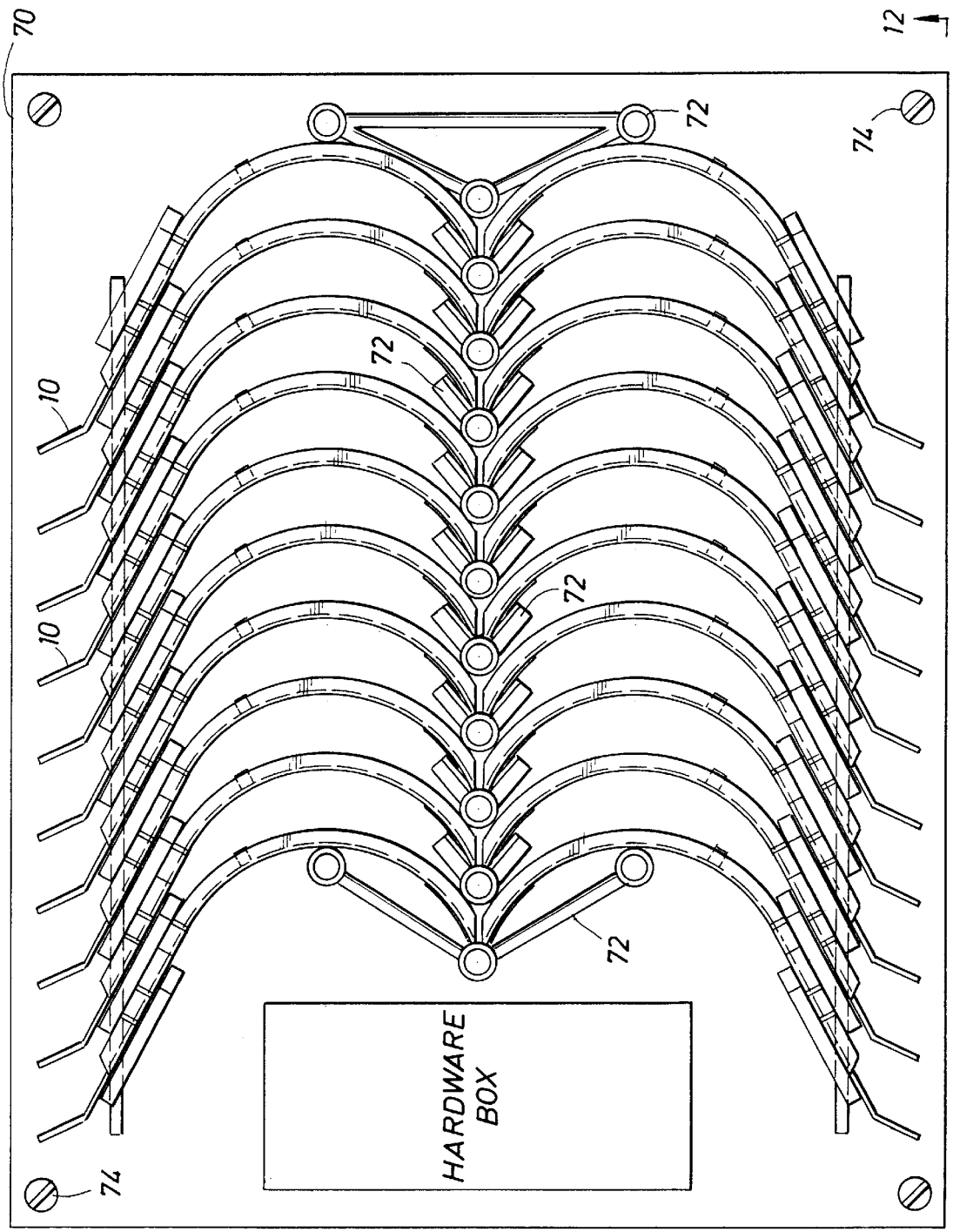
FIG. 11 is an overhead elevational view of a hardware box with stowed drilling riser fairings in accordance with the present invention.
Figure 12:
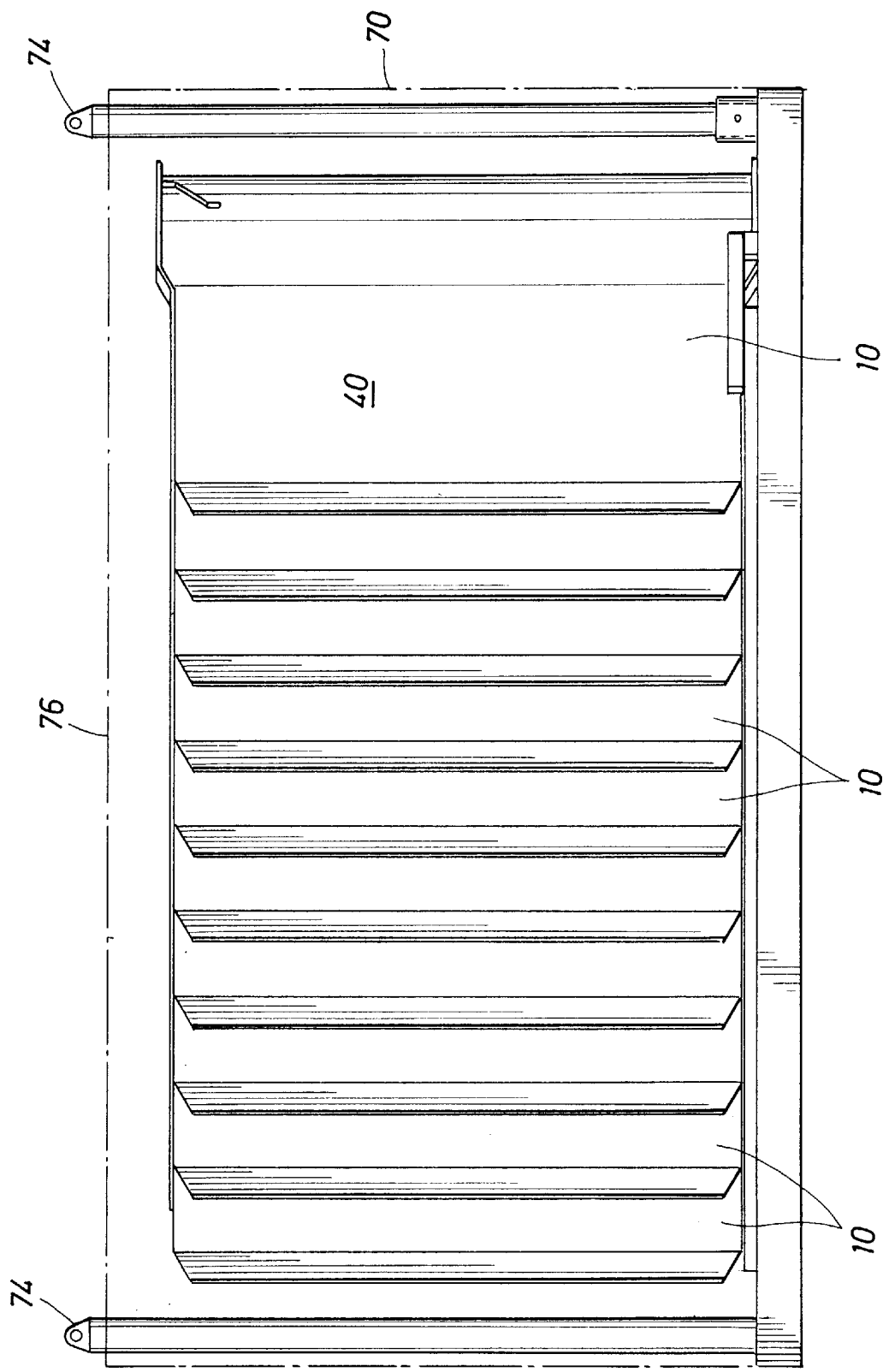
FIG. 12 is a side cross sectional view of the hardware box of FIG. 11, taken at line 12—12 in FIG. 11.
Figure 13:
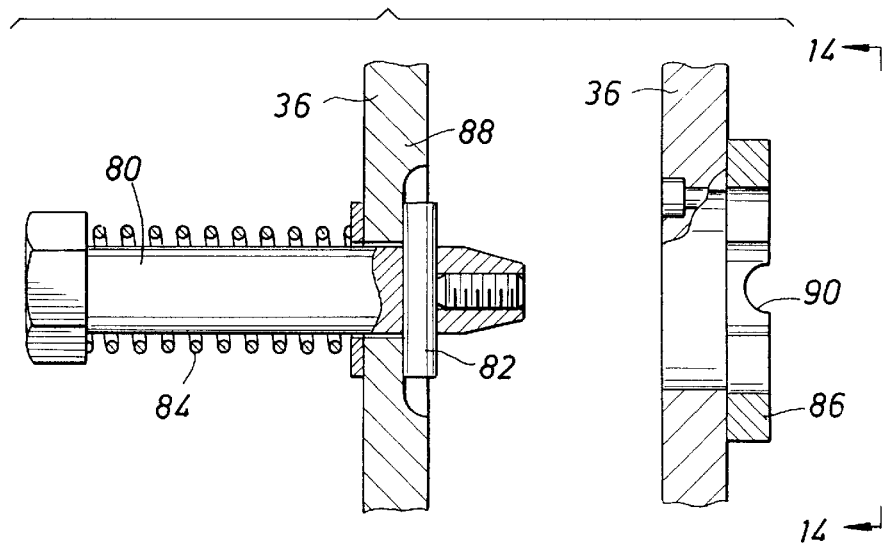
FIG. 13 is an end elevational view of tail connection system components prior to engagement.
Figure 14:
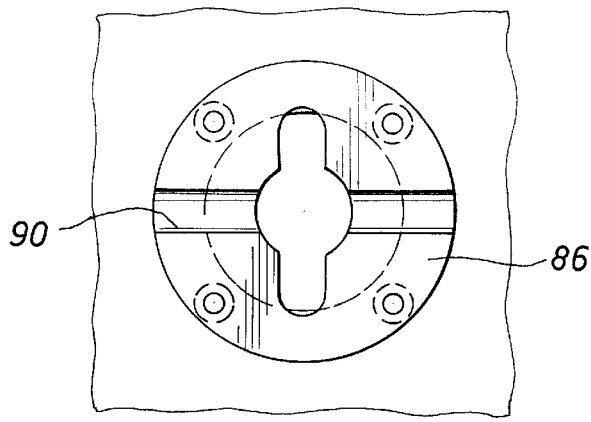
FIG. 14 is a side elevation view of a tail connection system component as seen from line 14—14 in FIG. 13.
Figure 15:
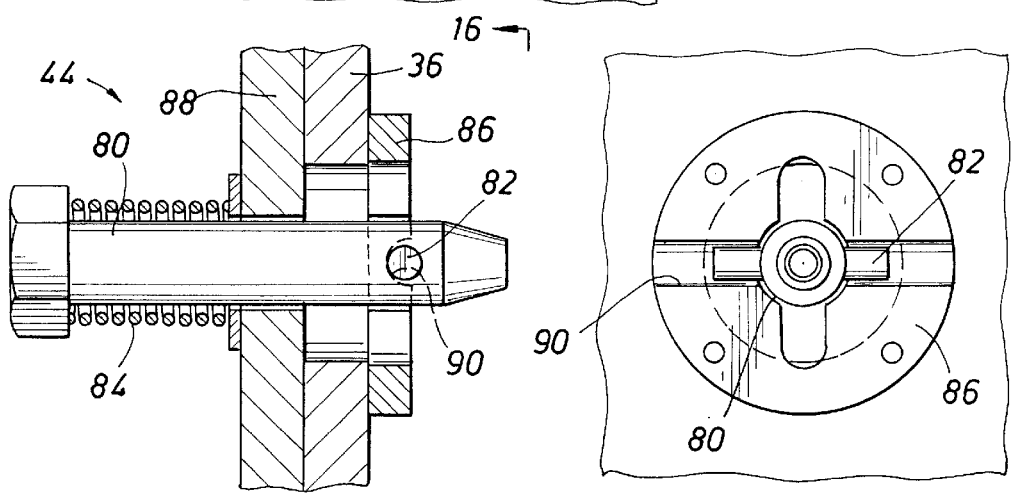
FIG. 15 is an end elevational view of tail connection system components in an engaged position.
Figure 16:
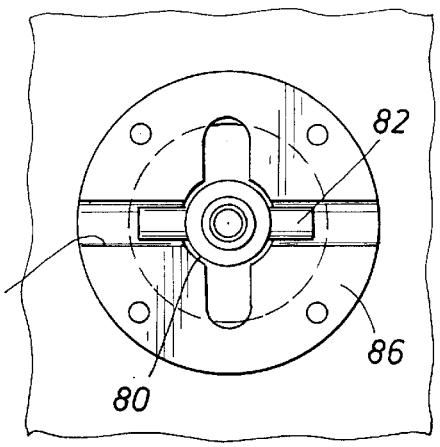
FIG. 16 is a side elevational view of a tail connection system components as seen from line 16—16 in FIG. 15.

FIGS. 11 and 12 illustrate an alternative for drilling riser fairing stowage using a modular hardware box 70. Removable stanchions 72 are pined to the hardware box and facilitate stacking the fairing shrouds on end which is the preference for easy handling by lift line at the lift eyes. Further, the hardware boxes are provided with lift points 74, covers 76, and easily relocated for remote stowage while other boxes are brought up for more fairings.

A tail connection system 44 is illustrated in FIGS. 13–16 which is particularly suited to the fairing of the present invention. Bolt 80 is passes through a bushing 88 and is provided with a key 82 on the far end. The bushing is attached to one of the tail edges. A spring 84 biases the key toward the bushing which is recessed to receive and orient key 82 in a position to begin engagement. A corresponding keyhole assembly 86 is provided on the other tail end. The key hole allows key 82 to pass when the tail edges are brought together and bolt 80 is pushed forward against the bias of spring 84. The bolt is rotated 90 degrees and released where the spring loaded key 82 seats securely into recess 90. This assembly facilitates alignment, engagement, disengagement.

In another aspect of the invention, a method for deploying a drilling riser fairing system is disclosed in which a first retaining ring 30A is installed on a buoyancy can 18 encircling drilling riser 16 and drilling riser fairing 10 is installed above the first retaining ring. Drilling riser fairing installation folds a pair of fairing sides 32 of fairing shroud 40 about an axially disposed hinge 22 to surround the buoyancy can above the first retaining ring. A tail connection system 44 secures the tail ends of the fairing sides together and a pair of struts 52 are installed to further secure fairing sides 32 together. A plurality of interior bearing pads 50 are provided on the internal circumference of the fairing shroud and axial bearing pads 48 and 60 are provided on flanges 46 at the upper and lower edges of the fairing shroud and the struts 52.

In yet another aspect of the present invention, a method for stowing drilling riser fairings is disclosed in which a lift harness is connected to lift eyes 62 on the exterior of the fairing shroud 40 and the tail connection system 44 is released from the tail edge of the fairing sides. Struts 52 are removed from the upper and lower flanges of the fairing sides which are then opened up about their hinged connection. The open fairing shroud is lifted and set down in a nested relationship with other removed fairing shrouds.

Other modifications, changes, and substitutions are also intended in the foregoing disclosure. Further, in some instances, some features of the present invention will be employed without a corresponding use of other features described in these illustrative embodiments. Accordingly, it is appropriate that the appended claims be construed broadly and in a manner consistent with the spirit and scope of the invention herein.

What is claimed is:

1. A fairing is disclosed for deployment about a drilling riser deployed in a deepwater application, comprising:
    a fairing shroud having a pair of fairing sides, each fairing side having a hinge edge and a tail edge and configured to have a hemicylindrical profile region that begins at the hinge edge and is configured to substantially encircle about one half of a cylindrically shaped drilling riser and a tail profile region that trails off from the hemicylindrical profile region;
    at least one hinge connecting the fairing sides together at their hinge edges;
    a pair of flanges, one each along an upper edge and a lower edge of the hemicylindrical profile region of each fairing side;
    a pair of bearing rings, one formed across the flange on the upper edge and one formed across the flange on the lower edge in the hemicylindrical profile region of each of the fairing sides;
    a tail connection system about which the trailing edge of the tail edge of the fairing sides are connectable together; and
    a pair of struts, one strut connectable between the fairing sides on the flange on the upper edge and one connectable at the tail end of the flange on the lower edge, each strut presenting an interior bearing surface tangential to a nominal interior circumference defined by the hemicylindrical profile regions of the fairing sides and an axial bearing surface on each end and each strut connected to the flanges in a manner that allows the struts to be relocated to positions that do not interfere with stowing the fairings.

2. A fairing in accordance with claim 1 wherein the fairing shroud is formed of fiberglass.

3. A fairing in accordance with claim 2 wherein the fiberglass fairing shroud has a gelcoat outer surface.

4. A fairing in accordance with claim 2 wherein the struts are connected to the fairing sides with pins.

5. A fairing in accordance with claim 4 wherein the pins are permanently secured to the struts and are secured to the flanges with lynch pins.

6. A fairing in accordance with claim 2 further comprising a dropped shoulder on the upper and lower edges of the tail end of the fairing sides.

7. A fairing in accordance with claim 6 further comprising a first bearing pad mounted to each of the struts to provide the interior bearing surface.

8. A fairing in accordance with claim 7 further comprising a second bearing pad mounted on each of the struts, said second pad extending axially to present an axial bearing surface at an even elevation with the bearing ring on that end of the fairing shroud.

9. A fairing is disclosed for deployment about a drilling riser with circumferencial buoyancy cans or buoyancy modules deployed in a deepwater application, comprising:
    a fiberglass fairing shroud having a pair of fairing sides, each fairing side having a hinge edge and a tail edge and configured to have a hemicylindrical profile region that begins at the hinge edge and is configured to substantially encircle about one half of the drilling riser and circumferencial buoyancy cans and a tail profile region that trails off from the hemicylindrical profile region;
    a plurality of stainless steel hinges connecting the fairing sides together at their hinge edges;
    a pair of flanges, one each along an upper edge and a lower edge of the hemicylindrical profile region of each fairing side and extending to the tail profile region with the dropped shoulders;
    a pair of bearing rings, one formed across the flange on the upper edge and one formed across the flange on the lower edge in the hemicylindrical profile region of each of the fairing sides;
    a tail connection system about which the trailing edge of the tail edge of the fairing sides are connectable together; said tail connection comprising:
        a pair of removable struts, one strut connected between the fairing sides on the flange on the upper edge and one connected at the tail end of the flange on the lower edge;
        a first bearing pad on each strut presenting an interior bearing surface tangential to a nominal interior circumference defined by the hemicylindrical profile regions of the fairing sides; and
        a second bearing pad mounted on each of the struts, said second pad extending axially to present an axial bearing surface at an even elevation with the bearing ring on that end of the fairing shroud.

10. A method for deploying a drilling riser fairing system, comprising:
    installing a first retaining ring on buoyancy can encircling the drilling riser;
    installing a drilling riser fairings above the first retaining ring, installing the drilling riser fairings comprising:
        folding a pair of fairing sides of a fairing shroud about an axially disposed hinge to surround the buoyancy can above the first retaining ring, the fairing shroud having and internal circumference and each fairing side terminating in a tail end;
        installing a tail connection system to secure the tail ends of the fairing sides together;
        installing a pair of removable struts to further secure the fairing sides together;
        providing a plurality of interior bearing pads on the internal circumference of the tailing shroud; and providing axial bearing pads on flanges on an upper edge and a lower edge of the fairing shroud.

11. A method for deploying a drilling riser fairing in accordance with claim 10 further comprising installing one or more subsequent drilling riser fairings to join the first drilling riser fairing in a set above the first retainer ring and installing a second retainer ring about the buoyancy can above the set.

12. A method for deploying a drilling riser fairing in accordance with claim 11 wherein installing a pair of struts comprises, for each strut, inserting pins mounted to protrude from the strut through holes in the flange on opposing fairing sides and inserting lynch pins into holes in the ends of the pins which protrude through the flanges.

13. A method for stowing a drilling riser faring comprising:

connecting a lift harness to a lift eye on the exterior of a fairing shroud;

removing a tail connection system from a tail edge of the fairing sides of the fairing shroud;

removing struts from an upper flange and a lower flange of the fairing sides;

opening up the fairing sides about their hinged connection;

lifting the open fairing shroud with a lift line; and setting the open fairing shroud in nested relationship with other removed fairing shrouds.

14. A method for stowing a drilling riser fairing in accordance with claim 13, further comprising stacking a plurality of the fairing shrouds on end within a hardware box.

15. A method for stowing a drilling riser fairing in accordance with claim 14, further comprising installing stanchions to the open fairing shrouds before stacking.

* * * * *